US006405166B1

United States Patent
Huang et al.

(10) Patent No.: US 6,405,166 B1
(45) Date of Patent: *Jun. 11, 2002

(54) MULTIMEDIA SEARCH APPARATUS AND METHOD FOR SEARCHING MULTIMEDIA CONTENT USING SPEAKER DETECTION BY AUDIO DATA

(75) Inventors: Qian Huang, Ocean, NJ (US); Ivan Magrin-Chagnolleau, Houston, TX (US); Sarangarajan Parthasarathy, New Providence; Aaron Edward Rosenberg, Berkeley Heights, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/976,023

(22) Filed: Oct. 15, 2001

Related U.S. Application Data

(63) Continuation of application No. 09/353,192, filed on Jul. 14, 1999.
(60) Provisional application No. 60/096,372, filed on Aug. 13, 1998.

(51) Int. Cl.$^7$ .......................... G10L 17/00; G10L 15/06; G10L 15/08
(52) U.S. Cl. ........................ 704/246; 704/243; 704/247
(58) Field of Search ............................... 704/231, 236, 704/239, 243–247

(56) References Cited

U.S. PATENT DOCUMENTS

| | | | |
|---|---|---|---|
| 4,773,093 A | 9/1988 | Higgins et al. | 704/247 |
| 5,271,088 A | 12/1993 | Bahler | 704/246 |
| 5,522,012 A | 5/1996 | Mammone et al. | 704/246 |
| 5,548,647 A | 8/1996 | Naik et al. | 704/246 |
| 6,317,710 B1 * | 11/2001 | Huang et al. | 704/231 |

OTHER PUBLICATIONS

D. Roy and C. Malamud, Speaker identification based text to audio alignment for an audio visual retrieval system, *Proc. ICASSP 97*, IEEE Intl. Conf. on Acoustics, Speech and Signal Processing, Munich, 1099–1102, 1997.

M–H. Siu, G. Yu, and H. Gish, An unsupervised, sequential learning algorigthm for the segmentation of speech waveforms with multiple speackers, *Proc. ICASSP 92*, IEEE Intl. Conf. on Acoustics, Speech and Signal Processing, San Francisco, vol. II, 189–192..

Speech segmentation and clustering based on speaker features, *Proc. ICASSP 93* IEEE Intl. Conf. on Acoustics, Speech and Signal Processing, Minneapolis 395–398, 1993.

C. Montacie and Marie–Jose Caraty, Sound Channel Video Indexing, ESCA, Eurospeech97, Rhodes, Greece ISSN 1018–4074, pp. 2359–2362.

(List continued on next page.)

*Primary Examiner*—Richemond Dorvil
*Assistant Examiner*—Daniel A. Nolan
(74) *Attorney, Agent, or Firm*—Oliff & Berridge, PLC

(57) ABSTRACT

A multimedia search apparatus and method for searching multimedia content using speaker detection to segment the multimedia content. The multimedia search apparatus receives a search request from a user device. The search request identifies the target speaker for which the search is to be conducted. Based on the search request, the multimedia search apparatus retrieves multimedia content from a multimedia database. The multimedia search apparatus retrieves models, such as Gaussian Mixture Models (GMMs), from a model storage device, corresponding to the target speaker and background data. Based on the retrieved models, the multimedia search device searches the multimedia data of the multimedia content and segments the multimedia data. The segments are identified by calculating an average normalized score for a block of frames of the multimedia data and determining if the average normalized score for the block of frames exceeds one or more predetermined thresholds.

34 Claims, 6 Drawing Sheets

OTHER PUBLICATIONS

L. Wilcox, F. Chen, D. Kimber, and V. Balasubramanian, Segmentation of speech using speaker identification, *Proc. ICASSP 94*, IEEE Intl. Conf. on Acoustics, Speech and Signal Processing, Adelaide, 161–164, 1994.

D.A. Reynolds & R.C. Rose, "Robust Text–Independent Speaker Identification Using Gaussian Mixture Speaker Models," *IEEE Trans. On Speech and Audio Processing*, vol. 3, 1995, pp. 72–83.

Foote et al. ("Finding Presentations in Recorded Meetings using Audio and VidEo Features," 1999 IEEE International Conference on Acoustics, Speech, and Signal Processing, Mar. 1999).

* cited by examiner

MULTIMEDIA SEARCH APPARATUS AND METHOD FOR SEARCHING MULTIMEDIA CONTENT USING SPEAKER DETECTION BY AUDIO DATA

This is a Continuation of application Ser. No. 09/353,192 filed Jul. 14, 1999. The entire disclosure of the prior application is hereby incorporated by reference in its entirety.

This nonprovisional application claims the benefit of U.S. provisional application No. 60/096,372 entitled "Speaker Detection in Broadcast Speech Databases" filed on Aug. 13, 1998. The provisional application and all references cited therein are hereby incorporated by reference.

BACKGROUND OF THE INVENTION

1. Field of Invention

This invention is directed to a multimedia search apparatus and methods for searching multimedia content using speaker detection to segment the multimedia content.

2. Description of Related Art

In one known method for speaker identification and verification, Gaussian Mixture Models (GMMS) are used to model the spectral shapes of the speaker's voice. This method is described in "Robust Text-Independent Speaker Identification Using Gaussian Mixture Speaker Models," Douglas A. Reynolds, *IEEE Transactions on Speech and Audio Processing*, vol. 3, no. 1, January 1995 (Reynolds), which is incorporated herein by reference. This method uses Gaussian Mixture Models to verify the identity of a speaker such as when conducting financial transactions. However, the above-described speaker identification and verification method assumes that only one speaker is the source of the audio input for all samples. Thus, this method is only practical for identifying a single speaker. Therefore, there is a need for new technology to provide more reliable speaker detection when more than one speaker may be present in multimedia information.

SUMMARY OF THE INVENTION

This invention provides multimedia search apparatus and methods for searching multimedia content using speaker detection to segment the multimedia content. The multimedia search apparatus and methods may aid in browsing multimedia content and may be used in conjunction with known browsing techniques such as word spotting, topic spotting, image classification, and the like.

The multimedia search apparatus receives a search request from a user device. The search request includes information regarding the target speaker for which the search is to be conducted. Based on the search request, the multimedia search apparatus retrieves the multimedia content from a multimedia database.

In one embodiment of the invention, the multimedia search apparatus retrieves Gaussian Mixture Models (GMMs) from a Gaussian Mixture Model storage device, corresponding to the target speaker and background data. Based on the retrieved Gaussian Mixture Models, the multimedia search device searches the multimedia data of the multimedia content and segments the multimedia data. The segments are identified by determining an average normalized score for blocks of frames of the multimedia data and determining if the average normalized score exceeds one or more predetermined thresholds. If the average normalized score exceeds the one or more thresholds, the frame may be part of a target speaker segment. If the normalized score falls below one or more of the thresholds, the frame may be considered to be in a background segment.

Once the segments are identified by the multimedia search device, the segments may be provided to the user device as results of the search. Accordingly, the user device may choose from the identified multimedia content and multimedia segments for playback.

BRIEF DESCRIPTION OF THE DRAWINGS

The preferred embodiments of the present invention will be described with reference to the following drawings, wherein like numerals designate like elements, and wherein.

DETAILED DESCRIPTION OF PREFERRED EMBODIMENTS

Figure 1:
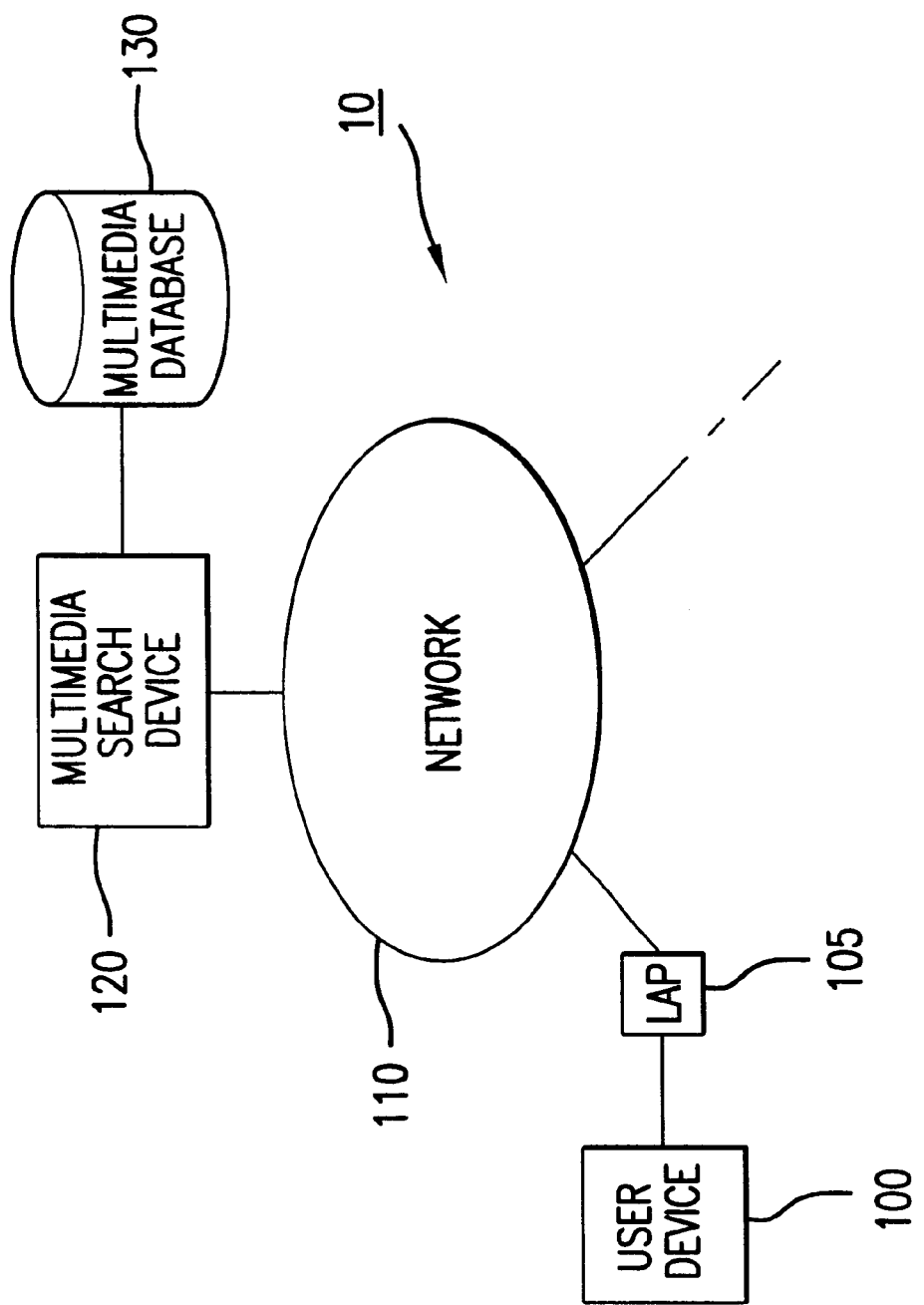
FIG. 1 is an exemplary block diagram of a system according to this invention.

FIG. 1 is an exemplary block diagram of a system 10 according to this invention. As shown in FIG. 1, the system 10 includes a user device 100, a local access provider (LAP) 105, a network 110, a multimedia search device 120, and a multimedia database 130.

The user device 100 may be any type device that is capable of sending and receiving communication signals. For example, the user device 100 may be a computer, a terminal, a wired or wireless telephone, a WebTV™ terminal, a personal digital assistant (PDA), and the like. For simplicity of the following description of the exemplary embodiments, it is assumed that the user device 100 is a computer. The user device 100 sends and receives communication signals to and from the network 110 via the local access provider 105.

The local access provider 105 may be any type of access provider that provides communication access to the network 110. For example, the local access provider 105 may be an Internet service provider (ISP), a network server, a local exchange carrier (LEC), a private branch exchange (PBX), and the like. The user device 100, for example, may "logonto" the local access provider 105 in order to gain access to the network 110 by, for example, dialing an access number of the local access provider 105 and entering a user ID and/or password.

The network 110 may be any type of network that is capable of sending and receiving communication signals. For example, the network 110 may be a data network, such as the Internet, an intranet, a local area network (LAN), a wide area network (WAN), and the like. The network 110 may also be a telecommunications network, such as a local telephone network, a long distance telephone network, a cellular telephone network, a satellite communications network, and the like. Furthermore, the network 110 may include more than one network and may include a plurality of different types of networks. Thus, the network 110 may include a plurality of data networks, a plurality of telecommunications networks, a combination of data and telecommunications networks, and the like.

The multimedia search device 120 is in communication with the network 110 and has access to the multimedia database 130. The multimedia database 130 stores multimedia content in the form of, for example, multimedia data files. The multimedia data files may include audio data, video data, textual data, and the like.

When the multimedia search device 120 receives a search request from the user device 100, the multimedia search device 120 searches the audio data of the multimedia content stored in the multimedia database 130 in order to identify which of the multimedia content files and their corresponding segments contain a particular target speaker. Based on the results of the search of the audio data, information regarding the multimedia content files identified as having target speaker segments and those segments of the multimedia content in which the target speaker is present may be provided to the user device 100 as results of the multimedia search.

The search request may be entered by a user of the user device 100 via a user interface (not shown) associated with the user device 100. The user interface may be, for example, a telephone keypad, a keyboard, a pointing device, a speech recognition system, and the like. The search request includes information regarding the target speaker for which the search is to be conducted and may also include other search criteria such as keywords, topics, image search criteria, and the like.

The multimedia search device 120 makes use of models of the target speaker, background audio data, and the like, when searching multimedia content for the presence of a target speaker. The models may include Gaussian Mixture Models, vector quantization codebook models, hidden Markov models, and the like. In short, any type of model that is suitable for text independent speaker detection may be used without departing from the spirit and scope of the present invention. For purposes of illustration, the description of the exemplary embodiments will assume that the models being utilized by the multimedia search device 120 are Gaussian Mixture Models.

Thus, in the following exemplary embodiments, the multimedia search device 120 makes use of Gaussian Mixture Models (GMMs) to model the target speaker, background speakers and other background audio data. The background speakers and other background audio information will hereafter be collectively referred to as background data. Gaussian Mixture Models are described, for example, in Reynolds, incorporated above.

The multimedia search device 120 stores a Gaussian Mixture Model for each possible target speaker and a set of background Gaussian Mixture Models for the background data. The Gaussian Mixture Model for each possible target speaker and the Gaussian Mixture Models for the background data are determined from training data, as described hereinafter.

The multimedia search device 120 uses the target speaker and background data Gaussian Mixture Models to generate an average normalized score for a block of frames of the audio data of the multimedia content and to determine if the average normalized score indicates that the target speaker may be present in the block of frames. The multimedia search device 120 may identify starting points and ending points of segments in the multimedia content where the target speaker is present by determining if the average normalized score for a particular block of frames meets one or more predetermined threshold conditions. Based on the determined starting and ending points of the audio data, the segments of the multimedia content that have the target speaker present may be provided to the user device 100.

Figure 2:
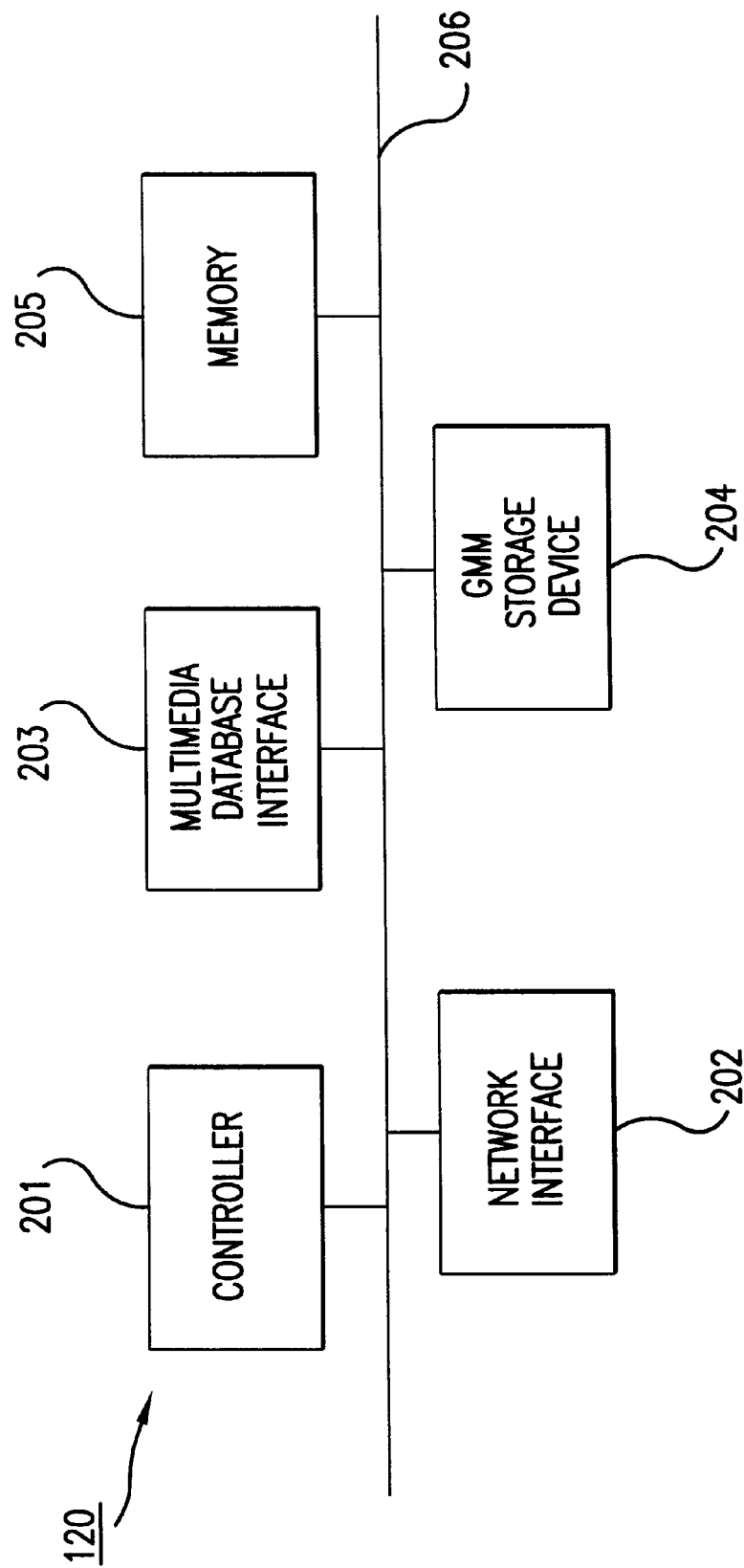
FIG. 2 is an exemplary functional block diagram of the multimedia search device of FIG. 1.

FIG. 2 is a functional block diagram of an exemplary embodiment of the multimedia search device 120 of FIG. 1. As shown in FIG. 2, the multimedia search device 120 includes a controller 201, a network interface 202, a multimedia database interface 203, a Gaussian Mixture Model storage device 204, and a memory 205. The above elements are in communication with one another via the control/signal bus 206.

When a user of a user device 100 sends a search request to the multimedia search device 120, the search request is received by the controller 201 via the network interface 202. The search request identifies the target speaker for which the search is to be conducted. As described above, the search request may be entered using a user interface (not shown) and includes information regarding the target speaker for which the search is to be conducted. For example, the target speaker may be selected from a list, a target speaker identifier may input via the user interface, a user may speak a name of the target speaker and have the name translated by a speech recognition system into a corresponding target speaker identifier, and the like. Any manner of identifying the target speaker for which the search is to be conducted may be used without departing from the spirit and scope of the invention.

Once the controller 201 receives the search request, the controller 201 retrieves a Gaussian Mixture Model for the identified target speaker and Gaussian Mixture Models for the background data from the Gaussian Mixture Model storage device 204. The background data Gaussian Mixture Models are preferably customized for the multimedia content that is to be searched. However, generalized background data Gaussian Mixture Models may be used for a plurality of multimedia content.

The controller 201 then searches the audio data of the multimedia content using the Gaussian Mixture Model for the target speaker and Gaussian Mixture Models for the background data. The searching of the audio data includes determining an average normalized score for a block of frames of the audio data and determining whether the average normalized score is above one or more predetermined thresholds.

If the average normalized score is above the one or more predetermined thresholds, it is determined that the target speaker is present in the block of audio data frames. Otherwise, it is determined that the speaker is not present in the block of audio data frames.

The start and end of segments of the audio data may be determined based on when the average normalized scores are above one or more predetermined thresholds and when they fall below one or more thresholds, respectively. The start point may be defined as the point in which the average normalized score first exceeds the threshold. The end point may be defined as the point where the average normalized score for a block of frames again falls below the threshold.

Once the audio data is divided into segments in which the target speaker is present and segments in which the target speaker is not present, those segments where the target speaker is present may be sent to the user device 100 as results of the multimedia search in addition to simply identifying those multimedia content files having a target speaker segment. These segments may be identified to the user device 100, for example by identifying via time stamps the starting and ending points of each segment, or they may be broadcast or played to the user device 100. Additionally, the user of the user device 100 may have indicated which of the segments are to be broadcast by selecting the segments via the user interface (not shown) once the segments are identified by the multimedia search device 120.

Next, the method of scoring frames and blocks of frames of the audio data will be described. An audio sample of multimedia content, for example, may be represented by a time sequence of N feature vectors $x_1, x_2, \ldots, x_t, \ldots, X_N$, where t is the time index of the frame. The feature vectors represent the short time spectrum of the audio sample and may be obtained, for example, by converting the audio data into $12^{th}$ order cepstral coefficients by carrying out a discrete cosine transformation on the output of 31 mel frequency spaced filters. The analysis windows may be, for example, 20 msecs in duration spaced every 10 msec through each audio data file. These cepstral feature vectors may be augmented, for example, by 12 delta-cepstral feature vectors determined over 5 frame windows. The delta-cepstral feature vectors represent dynamic measurements of the short time spectrum. All audio data frames having an energy below a predetermined energy threshold may be omitted.

The target speaker Gaussian Mixture Model will be designated $\lambda_T$ and the background Gaussian Mixture Models will be designated $\lambda_{B1}, \lambda_{B2}, \ldots, \lambda_{Bk}$, for example. Using these representations, a score, for example a log-likelihood score, for each frame t of the feature vector sequence with respect to the target Gaussian Mixture Model and the background Gaussian Mixture Models may be determined using the following relations:

$$S_t(\lambda_T) = \log p(x_t | \lambda Z_T) \tag{1}$$

$$S_t(\lambda_{Bk}) = \log p(x_t | \lambda_{Bk}) k=1, 2, \ldots, K \tag{2}$$

where $S_t(\lambda_T)$ is the score for the frame t with respect to the target Gaussian Mixture Model, $S_t(\lambda_{Bk})$ is the score for the frame t with respect to the background Gaussian Mixture Models, $p(x_t|\lambda_{Bk})$ is the Gaussian mixture probability density function, and k is the background Gaussian Mixture Model number. Successive frame scores may be averaged over blocks of M frames shifted every L frames through the sample. For example, a block of 100 frames, each frame being 10 msecs, may be shifted 20 frames through the audio data. In this way, there is an overlap in the frames being used for determining average frame scores. Thus, the j-th block score for the target model is:

$$S_j(\lambda_T) = 1/M \sum_{m=1}^{M} S_{t+m}(\lambda_T) \tag{3}$$

A likelihood ratio determination between the target and background block scores produces a normalized score $S_j$:

$$\text{i } S_j(\lambda_T; \lambda_{B1}, \ldots \lambda_{BK}) = S_j(\lambda_T) - \max S_j(\lambda_{Bk}) \tag{4}$$

The normalized score represents a difference between the score for the target speaker model and a function of the scores for the background models. In Equation 4, the function of the score for the background models is the maximum score value, however, other functions may be used without departing from the spirit and scope of the present invention.

The normalized scores are used by the controller 201 to detect the start and end points of the segments in which the target speaker is present. An exemplary fragment of program code in the C program language which performs the start and end point detection is provided in Appendix I. The exemplary fragment of program code utilizes three thresholds to identify and verify the start and end of target speaker segments, as described in more detail hereafter.

Figure 3:
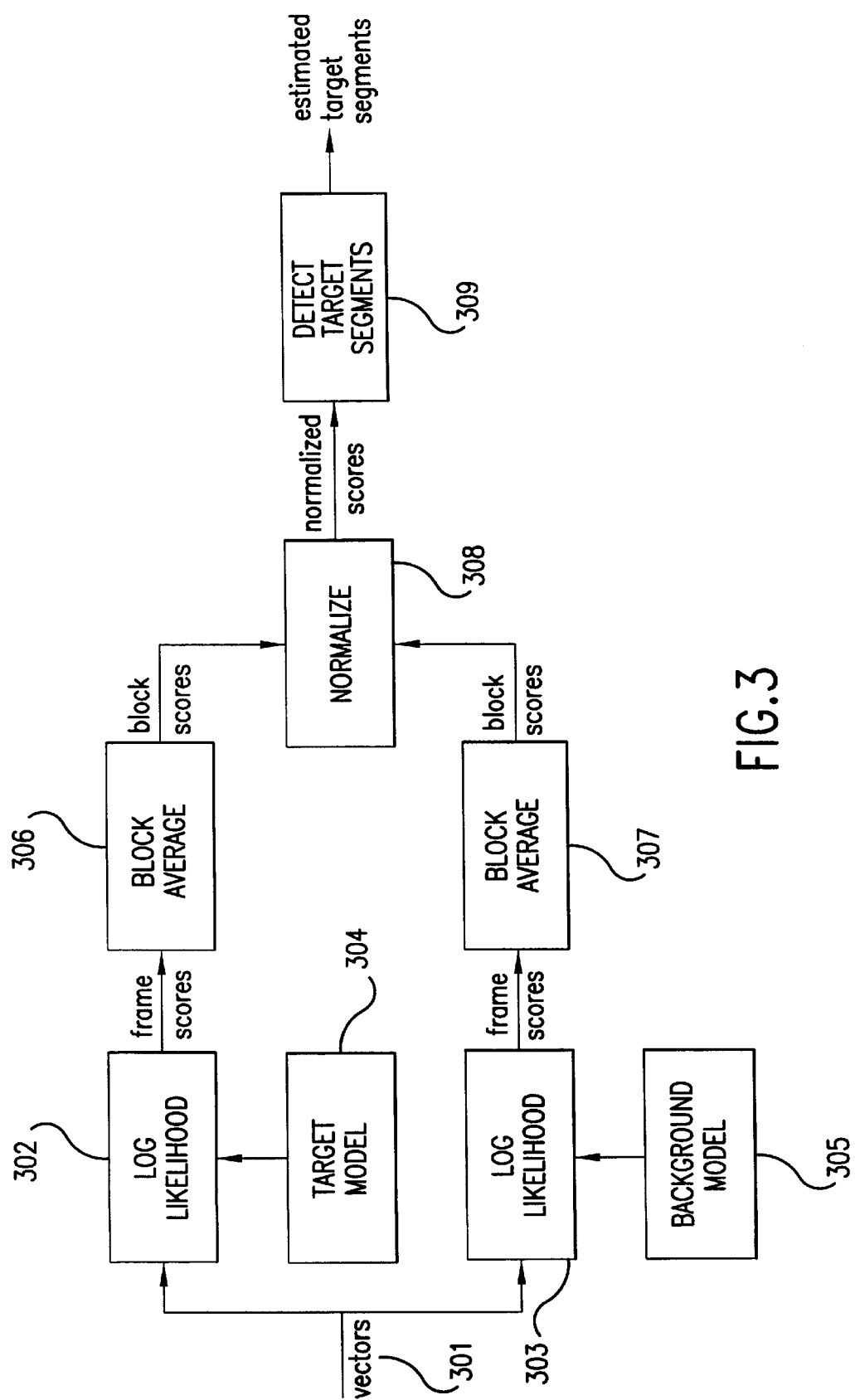
FIG. 3 is an exemplary data flow illustrating the scoring and segmenting method according to this invention.

FIG. 3 is an exemplary data flow diagram illustrating the above outlined method for scoring and detecting start and end points of the audio data segments. The data flow of FIG. 3 is illustrative of the above method when only a single background model is utilized. However, as discussed above, generally multiple background models may be used.

As shown in FIG. 3, the feature vectors 301 of the audio data of the multimedia content are input and the log likelihood scores 302, 303 for each frame are determined based on the target speaker Gaussian Mixture Model 304 and the background Gaussian Mixture Models 305. The frame scores are then block averaged 306, 307 and the block average scores are normalized 308. The normalized scores are then used to detect the target segments 309, i.e., the segments of the audio data in which the target speaker is present. These target segments are then output to the user device 100.

The Gaussian Mixture Models for the target speakers and the background data may be determined through an experimental training method. For example, pre-labeled training data may be used from which feature vectors are compiled into the Gaussian Mixture Models, as described, in the incorporated Reynolds publication, for example.

Figure 4:
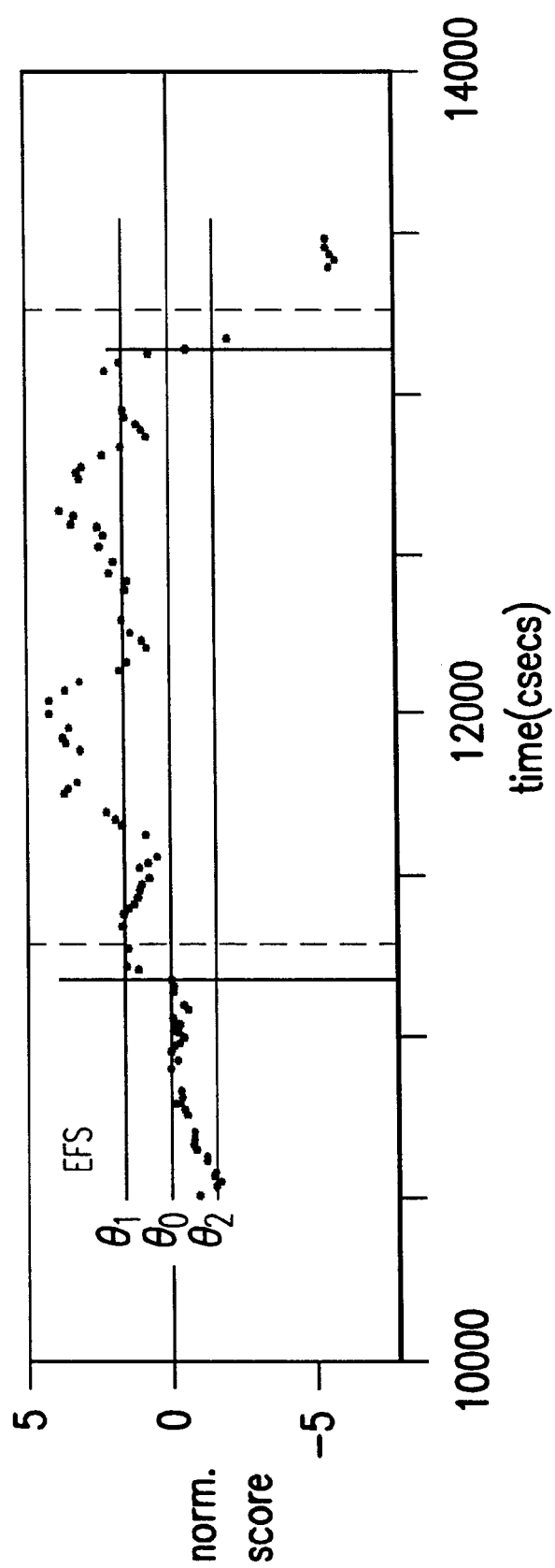
FIG. 4 is a example of search results obtained from the multimedia search device according to this invention.

FIG. 4 is an example of results of the multimedia search device 120 when the multimedia search device 120 utilizes three thresholds to identify and verify the start and end points of target speaker segments. The solid vertical lines designate the segment boundaries identified by the multimedia search device 120 and the dashed vertical lines designate the actual segment boundaries of the multimedia content for a particular target speaker. As shown in FIG. 4, a possible target segment start point is detected when the normalized score exceeds the threshold $\theta_0$, which in the case shown in FIG. 4 is at approximately 11,150 csecs. The possible end point of a target segment is detected when the normalized score falls below the threshold $\theta_0$, which in the case shown in FIG. 4 is at approximately 13,100 csecs.

Rather than using only a single threshold $\theta_0$, however, two thresholds $\theta_1$ and $\theta_2$ may be used to provide a verification of the segment boundary determinations. The thresholds $\theta_1$ and $\theta_2$ may be arbitrarily determined or may be determined based on empirical data; however, $\theta_1$ and $\theta_2$ should be chosen with the following constraint $\theta_2 < \theta_0 < \theta_1$. Thus, after the threshold $\theta_0$ has been exceeded and a tentative start of a target speaker segment has been identified, if the normalized block score for a subsequent block of frames exceeds the threshold $\theta_1$, the start point of the segment is detected as being at the point where the threshold $\theta_0$ was exceeded. Likewise, after the threshold $\theta_0$ has been traversed and a tentative end of the target speaker segment has been identified, if the normalized block score for a subsequent block of frames falls below $\theta_2$, the end point of the segment is detected as the point where the normalized block score fell below threshold $\theta_0$. If the normalized block score of a subsequent block of frames does not exceed threshold $\theta_1$, then the start and end of the target speaker segment is not verified and a target speaker segment is not identified by the multimedia search device 120.

As discussed above, Appendix I includes an example section of program code that implements this threshold approach. In Appendix I, "cand" represents a target speaker segment candidate flag, "score[block]" represents a score for a block of frames of audio data, "tentstart" represents a tentative start of a target speaker segment, and "tentend" represents a tentative end of a target speaker segment. The values th0, th1 and th2 correspond to threshold values $\theta_0$, $\theta_1$ and $\theta_2$, respectively.

As shown in Appendix I, if cand is zero, i.e., the block of frames is not a target speaker segment candidate, and the score for the block of frames is above a first threshold, th0, then a tentative start of a target speaker segment is identified (tentstart=block) and cand is set to 1. If the block of frames is a candidate for a target speaker segment (cand=1), and the score for the block of frames is greater than a second threshold, th1, then a legitimate start of a target speaker segment is identified and cand is set to 2.

If the block of frames is a candidate (cand=2) and the score is less than the first threshold, th0, then a tentative end of the target speaker segment is identified (tentend=block). If a legitimate start of a target speaker segment is identified (cand=2) and the score for a block of frames is less than a third threshold, th2, then the start of the target speaker segment is set to the tentative start and the end of the target speaker segment is set to the tentative end. In this way, the second and third threshold values, th1 and th2, serve as a check on the first threshold, th0, to increase the likelihood that detected tentative start and end points of a target speaker segment are in fact the actual start and end points of the target speaker segment.

In addition to or in place of setting actual threshold values $\theta_1$ and $\theta_2$, the present invention may set criteria such as requiring the normalized block score to be above the threshold $\theta_0$ for a predetermined amount of time, to be above the threshold value $\theta_1$ or below threshold value $\theta_2$ for a predetermined period of time, and the like. In short, any type of criteria may be sent to increase the reliability of the detection of the start and end points of the target speaker segments.

Figure 5A:
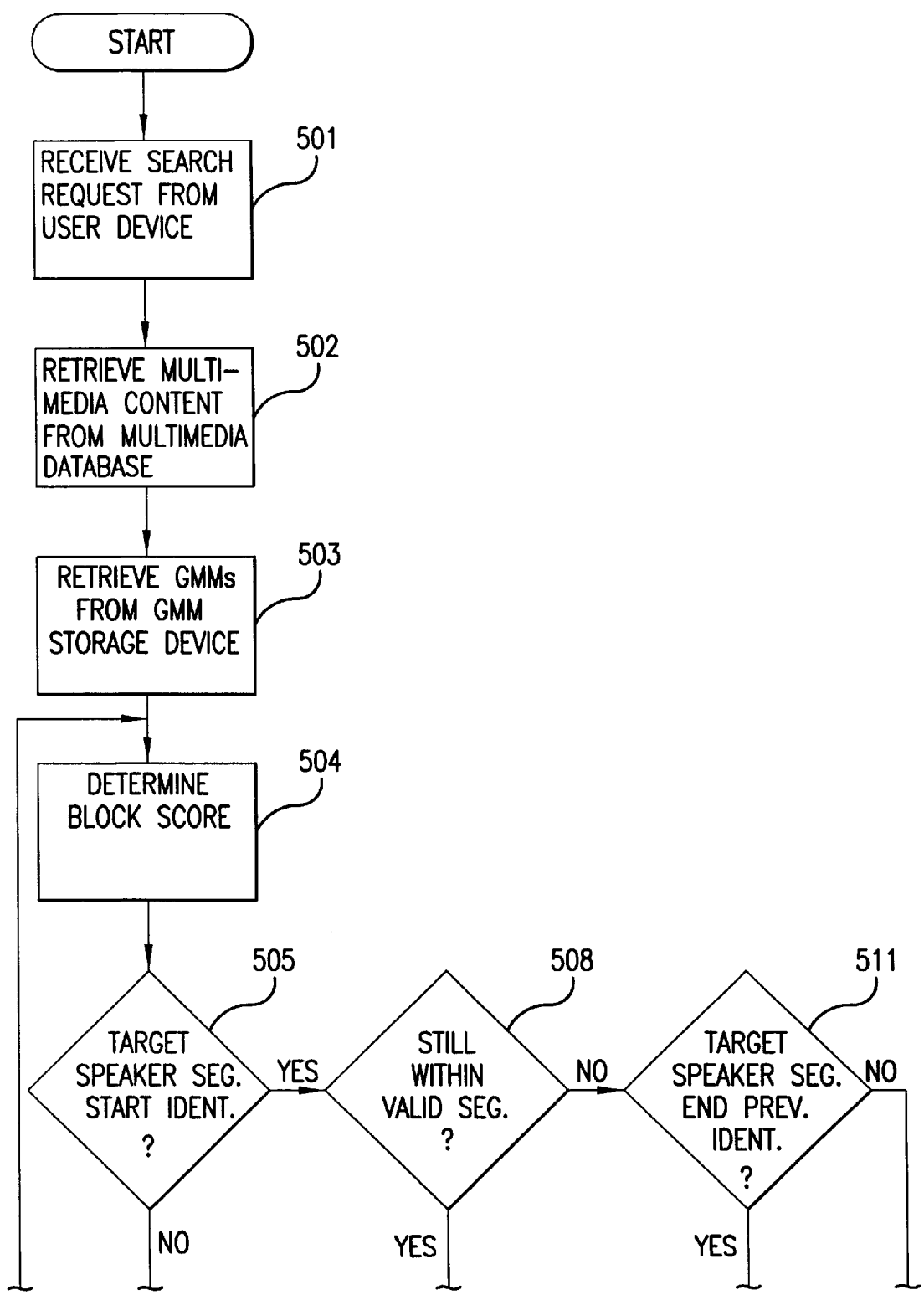
FIG. 5 is a flowchart outlining a first exemplary embodiment operation of the advertisement service provider according to this invention.
Figure 5B:
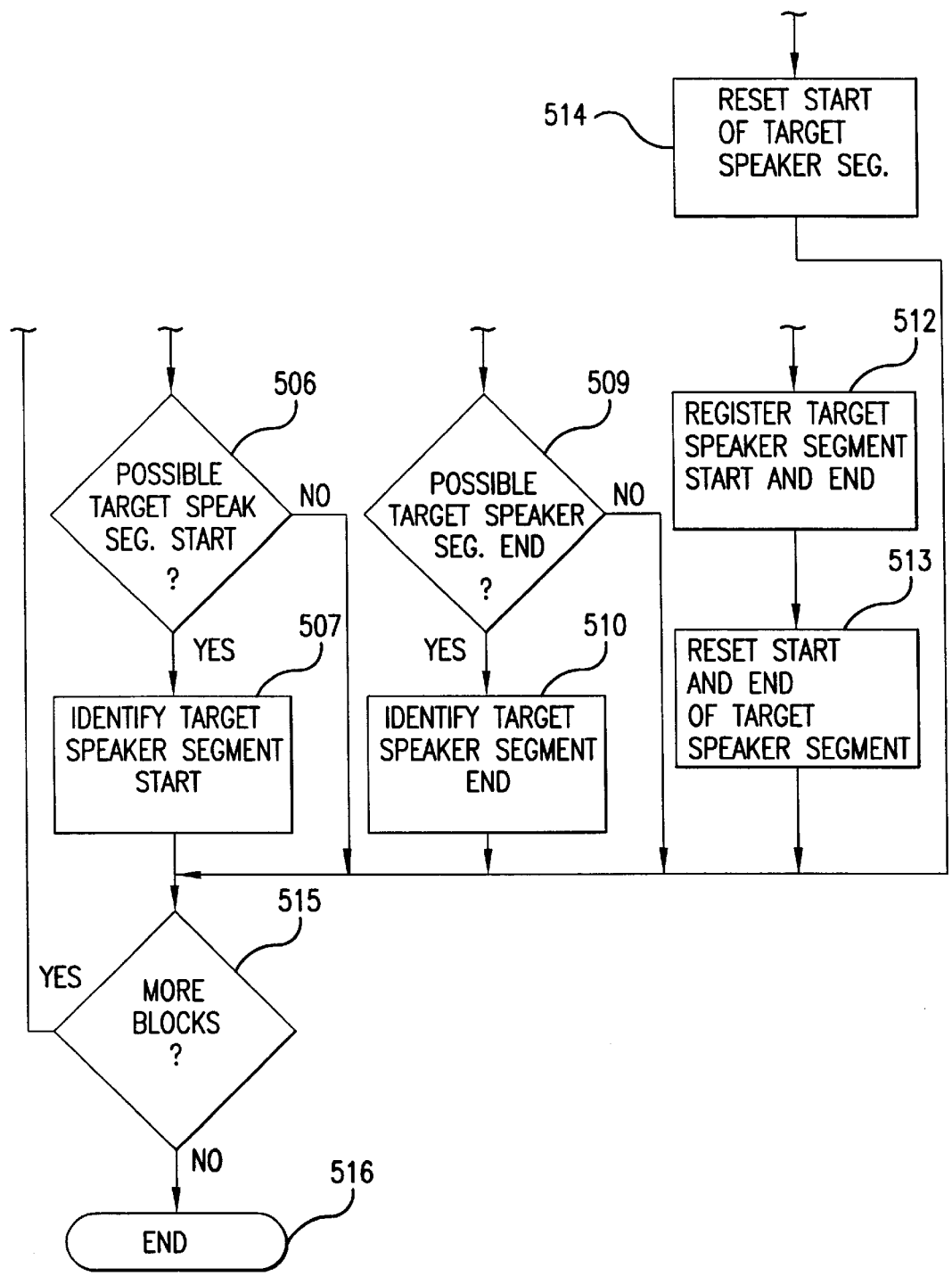

FIG. 5 is an exemplary flowchart outlining a method of searching multimedia content according to the present invention. The exemplary flowchart of FIG. 5 is a generalized description of the steps performed by the method according to the present invention. The details of how each step in the flowchart is performed have been previously described or may be apparent to those of ordinary skill in the art. Various modifications and additions to the flowchart of FIG. 5, as may be apparent to those of ordinary skill in the art in view of this disclosure, may be made without departing from the spirit and scope of the invention.

As shown in FIG. 5, in step 501, the controller 201 receives a search request from the user device 100 and goes to step 502. In step 502, the controller 201 retrieves the multimedia content, identified by the search request, from the multimedia database 130. Next, in step 503, the controller 201 retrieves the Gaussian Mixture Models associated with the target speaker, identified in the search request, and background data.

In step 504, the controller 201 determines normalized scores for audio data frames of the multimedia content and averages these normalized scores over a block of frames to obtain a block score, and goes to step 505. In step 505, the controller 201 determines whether a possible, or tentative, start of a target speaker segment has been previously identified, such as in a previous iteration of the flowchart. If so, control goes to step 508; otherwise, control continues to step 506. In step 506, the controller 201 determines if the block score obtained in step 504 is such that a possible start of a target speaker segment is identified. If so, control goes to step 507; otherwise control skips to step 515. This determination may be made based on preset threshold values in the manner described above.

In step 507, the controller 201 identifies a possible target speaker segment start and goes to step 515. In step 515, the controller 201 determines if there are more blocks to be processed. If so, control returns to step 504; otherwise, control goes to step 516 and ends.

In step 505, if a possible start of a target speaker segment has been identified, control goes to step 508. In step 508, the controller 201 determines if the block score obtained in step 504 indicates that the block of frames is still within a valid target speaker segment. If so, control goes to step 509; otherwise, control goes to step 511. In step 509, the controller 201 determines if the block score from step 504 identifies a possible target segment end. If so, control goes to step 510; otherwise control goes to step 515. In step 510, the controller 201 identifies a possible target speaker segment end and goes to step 515.

In step 508, if the block score from step 504 indicates that the block of frames is not within a valid target speaker segment, control goes to step 511. In step 511, the controller 201 determines if a possible target speaker segment end has been identified. If so, control goes to step 512; otherwise, control goes to step 514 where the possible target speaker segment start is reset and control goes to step 515. In step 512, the controller 201 registers the target speaker segment start and end to mark the target speaker segment as a confirmed target speaker segment. Then in step 513, the controller 201 resets the possible target speaker segment start and end so that a new target speaker segment may be identified if further blocks are to be processed.

While the above embodiments describe the multimedia search device 120 as a separate device connected to the network 100, the present invention is not limited to such a configuration. The multimedia search device 120 may be distributed throughout the network 110, for example.

Alternatively, the multimedia search device 120 and user device 100 may be combined into a single stand-alone device. In this case, the multimedia search device 120 would not need the network interface 202. Furthermore, the multimedia database 130 may be a floppy disk, hard disk, CD-ROM, ZIP disk, and the like, and the multimedia database interface 203 may be a corresponding drive.

As shown in FIGS. 1 and 2, the method of this invention is preferably implemented on a programmed processor. However, the multimedia search device 120 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device capable of implementing the flowchart shown in FIG. 5 can be used to implement the multimedia search device 120 functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of segmenting multimedia data using audio information, comprising:

receiving a search request identifying at least one target speaker;

retrieving at least one model for the at least one target speaker; and segmenting the multimedia data into one or more target speaker segments and background segments based on feature vectors of the multimedia data and the at least one model for the at least one target speaker, wherein the step of segmenting comprises:
reading a first block of frames of the multimedia data;
determining a score for the first block of frames based on the at least one model for the at least one target speaker; and
determining if the score for the first block of frames is above or below a first threshold.

2. The method of claim 1, further comprising:
identifying the first block of frames as part of a target speaker segment if the score for the block of frames is above the predetermined threshold; and
identifying the first block of frames as part of a background segment if the score for the block of frames is below the predetermined threshold.

3. The method of claim 1, further comprising:
identifying a tentative start point of a target speaker segment if the score for the first block of frames is above the first threshold; and
identifying a tentative end point of a target speaker segment if the score for the first block of frames is below the first threshold.

4. The method of claim 3, further comprising:
reading a second block of frames of the audio data;
determining a score for the second block of frames based on the model for the target speaker;
verifying the tentative start point of the target speaker segment if the score for the second block of frames is above a second threshold; and
verifying the tentative end point of the target speaker segment if the score for the second block of frames is below a third threshold.

5. The method of claim 1, wherein the score is a normalized score.

6. The method of claim 5, wherein the normalized score is calculated based on the model for the target speaker and one or more background data models.

7. The method of claim 1, wherein the score is an averaged normalized score for the first block of frames.

8. The method of claim 1, further comprising:
sending at least one of (a) at least a portion of the target speaker segments and (b) at least a portion of the background segments to a user device from which the search request was received to enable the user device to reproduce a multimedia presentation incorporating the at least one of (a) the at least a portion of target speaker segments and (b) the at least a portion of the background segments.

9. The method of claim 8, wherein the user device is one of a computer, a wired telephone, a wireless telephone, a Web TV™ terminal, and a Personal Digital Assistant.

10. The method of claim 1, wherein the at least one model for the at least one target speaker is a Gaussian Mixture Model.

11. The method of claim 1, wherein the at least one model for the at least one target speaker is a vector quantization codebook model.

12. The method of claim 1, wherein the at least one model for the at least one target speaker is a hidden Markov model.

13. The method of claim 1, further comprising retrieving at least one model for background, wherein the step of segmenting includes segmenting the multimedia data into the one or more target speaker segments and the background segments based on the at least one model for the background.

14. The method of claim 13, wherein the at least one model for the background is a Gaussian Mixture Model.

15. The method of claim 13, wherein the at least one model for the background is a vector quantization codebook model.

16. The method of claim 13, wherein the at least one model for the background is a hidden Markov model.

17. A user device that receives at least one of (a) at least a portion of the target speaker segments and (b) at least a portion of the background segments that are segmented by the method of claim 1 and reproduces a multimedia presentation incorporating the at least one of (a) the art least a portion of the target speaker segments and (b) the at least a portion of the background segments.

18. The user device of claim 17, wherein the user device is one of a computer, a wired telephone, a wireless telephone, a WebTV™ terminal, and a Personal Digital Assistant.

19. An apparatus that identifies segments of multimedia data for retrieval, comprising:
a controller;
a network interface; and
a memory, wherein the controller receives a search request via the network interface identifying at least one target speaker, retrieves at least one model for the at least one target speaker from the memory, and segments the multimedia data into one or more target speaker segments and background segments based on feature vectors of the multimedia data and the at least one model for the at least one target speaker;

wherein the controller segments the multimedia data by reading a first block of frames of the multimedia data, determining a score for the first block of frames based on the at least one model for the at least one target speaker, and determining if the score is above or below a first threshold.

20. The apparatus of claim 19, wherein the controller identifies the first block of frames as part of a target speaker segment if the score is above the predetermined threshold and identifies the first block of frames as part of a background segment if the score is below the predetermined threshold.

21. The apparatus of claim 19, wherein the controller identifies a tentative start point of a target speaker segment if the score is above the first threshold and identifies a tentative end point of a target speaker segment if the score is below the first threshold.

22. The apparatus of claim 21, wherein the controller reads a second block of frames of the audio data, determines a score for the second block of frames based on the model for the target speaker, verifies the tentative start point of the target speaker segment if the score for the second block of frames is above a second threshold, and verifies the tentative end point of the target speaker segment if the score for the second block of frames is below a third threshold.

23. The apparatus of claim 19, wherein the score is a normalized score.

24. The apparatus of claim 23, wherein the normalized score is calculated based on the model for the target speaker and one or more background data models.

25. The apparatus of claim 19, wherein the score is an averaged normalized score for the first block of frames.

26. The apparatus of claim 19, wherein the controller sends at least one of (a) at least a portion of the target speaker segments and (b) at least a portion of the background segments to a user device from which the search request was received to enable the user device to reproduce a multimedia presentation incorporating the at least one of (a) the at least a portion of target speaker segments and (b) the at least a portion of background segments.

27. The apparatus of claim 26, wherein the user device is one of a computer, a wired telephone, a wireless telephone, a Web TV™ terminal, and a Personal Digital Assistant.

28. The apparatus of claim 19, wherein the at least one model for the at least one target speaker is a Gaussian Mixture Model.

29. The apparatus of claim 19, wherein the at least one model for the at least one target speaker is a vector quantization codebook model.

30. The apparatus of claim 19, wherein the at least one model for the at least one target speaker is a hidden Markov model.

31. The apparatus of claim 19, wherein the controller retrieves at least one model for background and segments the multimedia data into the one or more target speaker segments and the background segments based on the at least one model for the background.

32. The apparatus of claim 31, wherein the at least one model for the background is a Gaussian Mixture Model.

33. The apparatus of claim 31, wherein the at least one model for the background is a vector quantization codebook model.

34. The apparatus of claim 31, wherein the at least one model for the background is a hidden Markov model.

* * * * *